No. 693,695. Patented Feb. 18, 1902.
J. R. FAULK.
MANURE DISTRIBUTING CART.
(Application filed Oct. 15, 1901.)
(No Model.)
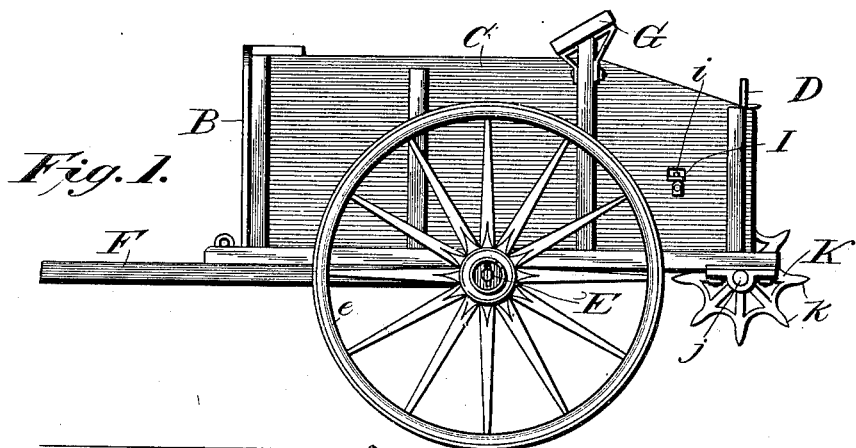
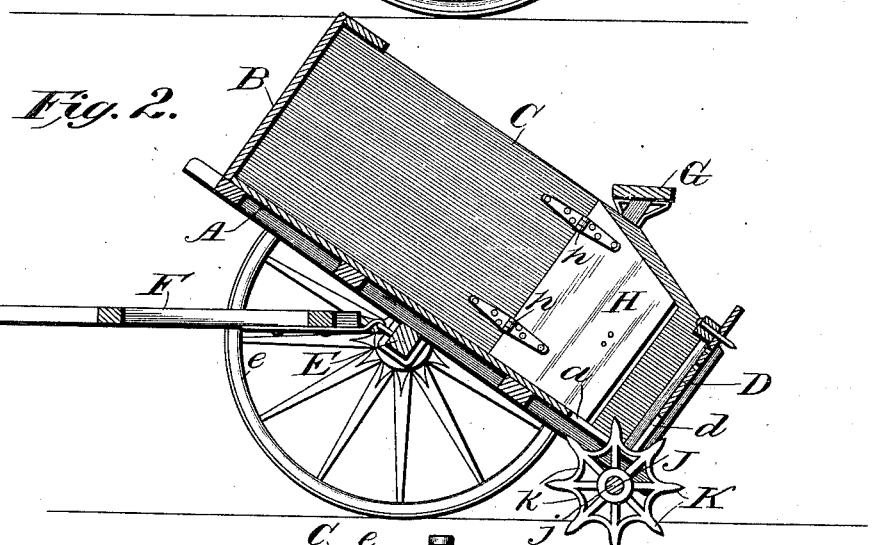
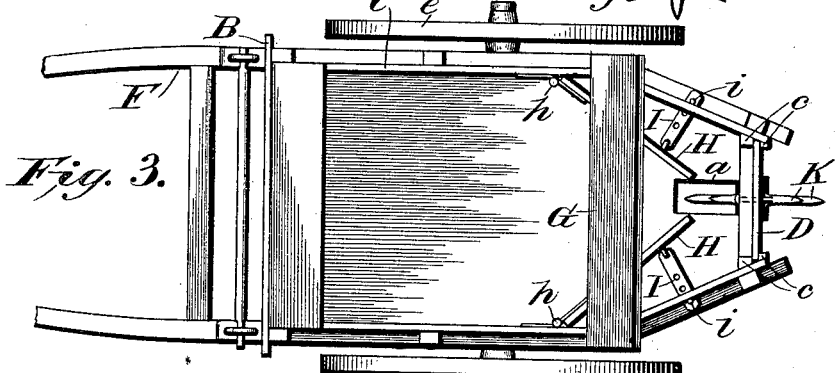
Witnesses
C. H. Walker.
James R. Mansfield.
Inventor
John R. Faulk
by Alexander & Powell
Attorneys
THE NORRIS PETERS CO., PHOTO-LITHO., WASHINGTON, D. C.

UNITED STATES PATENT OFFICE.

JOHN R. FAULK, OF MAYOCK, NORTH CAROLINA.

MANURE-DISTRIBUTING CART.

SPECIFICATION forming part of Letters Patent No. 693,695, dated February 18, 1902.

Application filed October 15, 1901. Serial No. 78,685. (No model.)

*To all whom it may concern:*

Be it known that I, JOHN R. FAULK, of Mayock, in the county of Currituck and State of North Carolina, have invented certain new and useful Improvements in Manure-Distributing Carts; and I hereby declare that the following is a full, clear, and exact description thereof, reference being had to the accompanying drawings, which form part of this specification.

This invention is an improved manure-distributing cart; and its object is to provide a simple and efficient manure-distributing cart having a spud-wheel which supports the cart during the spreading operation, removes the manure from the cart, and partially forks the manure into the ground, thus effecting the distribution of the manure in the most beneficial manner.

The invention therefore consists in the novel construction of the manure-spreading cart hereinafter claimed and described with reference to the accompanying drawings, which illustrate the same, and wherein—

Figure 1 is a side elevation of the cart as on the road; Fig. 2, a longitudinal section therethrough in working position, and Fig. 3 a top plan view thereof.

The body of the cart consists of bottom A, front B, and sides C, framed together as usual; but the bottom tapers toward its tail end and has a central slot $a$ therein, as shown. The sides C converge at their rear ends, terminating at opposite sides of slot $a$, as shown. The rear end of the body is closed by an end-gate D, provided with a vertical slot $d$ in its lower part, adapted to register with slot $a$ in bottom A, said gate being vertically adjustable in guides $c$ on sides C, as shown. The body is mounted on an axle E, supported on wheels $e$, and hinged to shafts F, so that the cart can be dumped at will. A seat-board G may be placed across the body near the rear end thereof, as shown.

Within the body near the rear end thereof are two guide-board deflectors H H, hinged at their front ends to the adjoining sides of the body, as at $h$, and the rear ends of these deflectors extend toward slot $a$ and may be adjusted more or less closely together by any suitable means—such for example, as straps I, pivoted to the upper ends of the deflectors and provided with a series of perforations, any one of which can be engaged with a pin $i$ on the adjoining side of the cart, so as to hold the deflectors in the desired position. These deflectors serve to direct the material properly to the spud-wheel and are adjusted more or less closely together, according to the fineness or coarseness of the manure being distributed.

The spud-wheel comprises a hub J and a series of radial spuds K, projecting from the hub and adjoining spuds, being connected near their outer ends by bands or straps $k$, beyond which the spuds project sufficiently to insure their feeding the manure from the cart and their firm bite into the ground when the cart is dumped. The spud-wheel is journaled on a shaft $j$, secured to the bottom of the body across the rear open end of slot $a$, so that the spud-wheel works through and in slots $a\,d$ of the bottom and end-gate, as shown.

In operation the deflectors H are adjusted the desired distance apart, according to the grade of manure to be distributed. The cart is then filled with manure and driven onto the field, where it is to be distributed. When the cart is in position over the row to be fertilized, the cart is dumped, lowering the spud-wheel onto the ground, said wheel then supporting the rear end of the cart and its spuds piercing the soil, and as the cart progresses the spuds cause the positive rotation of the spreading-wheel, and they also drag the manure from the cart and in a measure fork it into the ground. The spud-wheel thus supports the body and acts as a spreader, a forker, and cultivator, and requires no driving mechanism. It also loosens the soil and more or less covers the manure as it spreads the same. The practical advantages of having the wheel fork up the ground as it lays the manure are obvious, as the valuable chemicals in the manure are thus more readily imparted to the soil, and the manure (if light) is less liable to be blown away or scattered by the wind by being partially forked into or buried in the freshly spaded or forked ground by the action of the spud-wheel. The driver can seat himself on the seat and with an ordinary fork keep the manure in the cart moving down to the spud-wheel if it should clog; but the wheel itself will naturally impart a jogging motion to the cart-body which will facilitate the feed of the manure to the wheel. The driver can also release the deflectors H and increase the feed of manure if he desires or it becomes advisable to do so.

Having thus described my invention, what I therefore claim as new, and desire to secure by Letters Patent thereon, is—

1. In a manure-spreader, the combination of a dumping-body, with a spud-wheel journaled on the rear end thereof and adapted to both directly support the rear end of body when the same is dumped, and also to feed manure from the cart, substantially as described.

2. In a manure-spreader, the combination of the body having a slot in its bottom at the rear end thereof; with a spud-wheel journaled in said slot adapted to directly support the body when the cart is dumped and to feed manure from the cart and spud or fork the ground, substantially as described.

3. In a manure-spreader, the combination of the body having a contracted rear end, and a slot in the bottom of the cart at the rear end thereof; with a wheel journaled in said slot having a series of radial spuds and adapted to directly support the body when the cart is dumped and to also feed manure from the cart and spud or fork the ground, substantially as described.

4. In a manure-spreader, the combination of the body having a bottom provided with a slot in its rear end, and side walls converging toward the slot, and opposite deflectors within the body in front of the slot; with a single spud-wheel working in said slot, having a series of radially-projecting spuds, said wheel being adapted to directly support the rear end of the body when the latter is dumped, substantially as described.

5. The combination of the axle and shaft, the body attached to the axle having a bottom provided with a slot in its rear end, side walls converging toward the slot and a slotted end-gate; with the wheel working in said slot, and journaled on a shaft attached to the body, said wheel having a series of radially-projecting spud-arms connected to a central hub, and connected together near their outer ends, said wheel being adapted to directly support the rear end of the body when the latter is dumped, and to feed the manure from the body substantially as and for the purpose set forth.

In testimony that I claim the foregoing as my own I affix my signature in presence of two witnesses.

JOHN R. FAULK.

Witnesses:
EDMOND WILSON,
DALLAS BAXTER.